July 15, 1952  F. R. LONG  2,603,450
PENDULUM-TYPE BALL CHECK VALVE
Filed Oct. 14, 1948
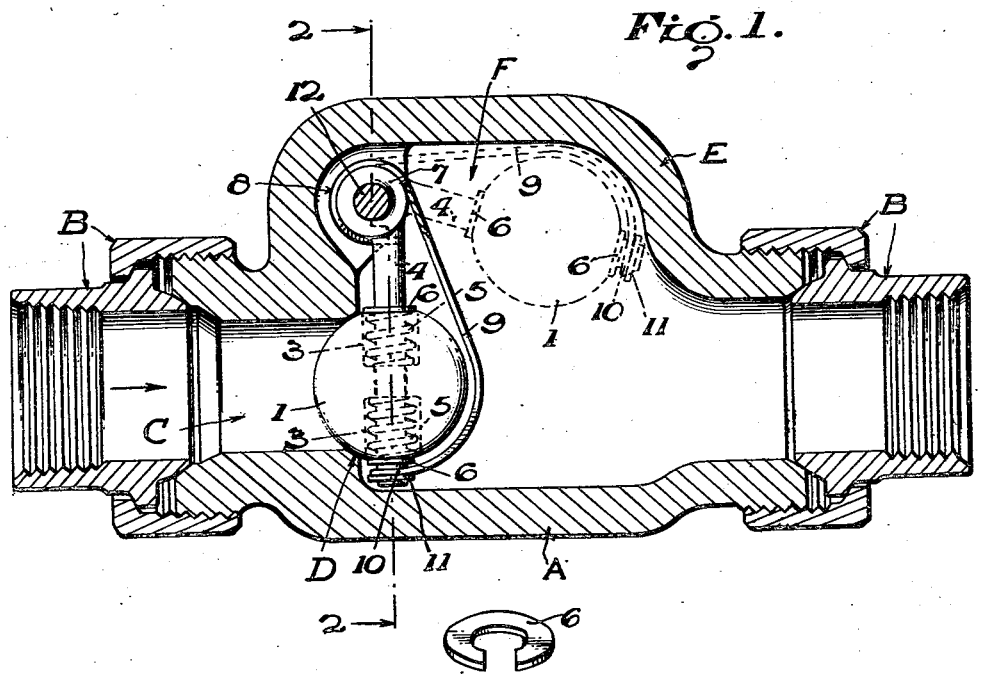
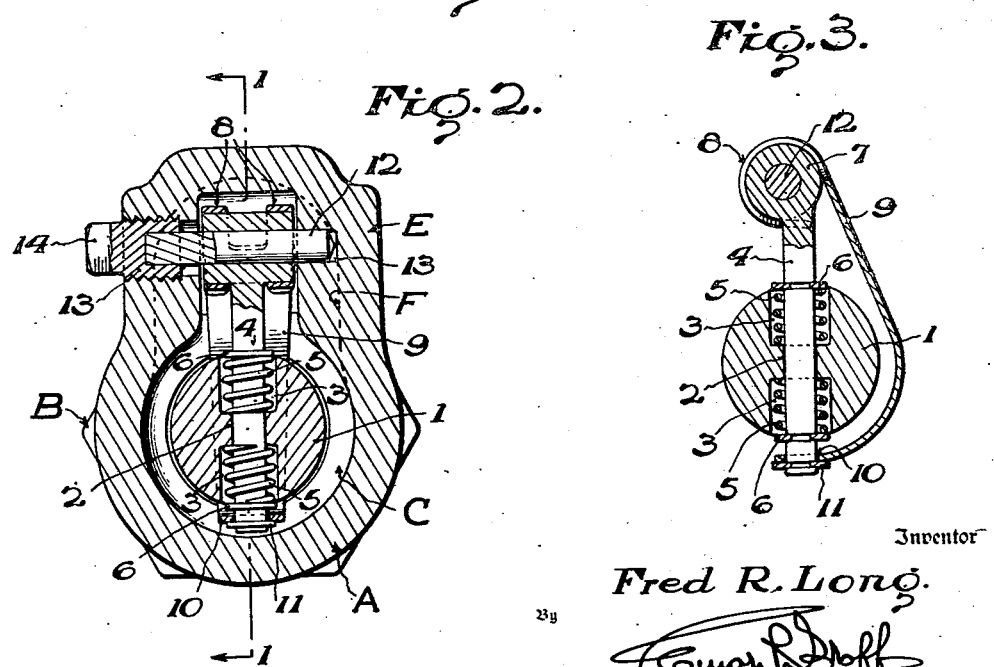
Inventor
Fred R. Long.

Patented July 15, 1952

2,603,450

UNITED STATES PATENT OFFICE 2,603,450

PENDULUM-TYPE BALL CHECK VALVE

Fred R. Long, Catawissa, Pa.

Application October 14, 1948, Serial No. 54,465

6 Claims. (Cl. 251—123)

This invention relates to check valves, and more particularly to a valve including a pendulum-type ball having special features of construction particularly adapting the same to heavy duty installations.

A primary object of the invention is to provide a novel mounting for the ball in combination with a casing or housing which permits the valve to open fully in one direction to allow unobstructed flow of liquids, gases, or the insertion of cleaning devices through the valve. In that connection, the invention also provides a pendulum-type ball valve arrangement which is full opening and operated in either a horizontal or vertical position.

Another and more specific object of the invention is to provide a novel ball and ball mounting which includes means for suspending the ball on a link or lever whereby the ball is not only free to rotate on its own axis about the link so as to continually present new surfaces to the valve seat, but is also mounted on the link by suitable alignment springs which prevent undue shifting of the ball longitudinally on the link and at the same time insure alignment of the ball with the valve seat. In other words, the ball is resiliently mounted on the link so as to have substantially a floating action thereon in order to insure the ball readily and quickly adjusting itself to the seat in its movement relative thereto.

A further object of the invention is to provide the pendulous ball assembly with a shock spring for preventing the ball from striking the casing with a sharp blow or impact if and when it is unseated quickly by a surge of fluid pressure in the line.

With the above and other objects in view which will more readily appear as the nature of the invention is better understood, the same consists in the novel construction, combination, and arrangement of parts, hereinafter more fully described, illustrated and claimed.

A preferred and practical embodiment of the invention is shown in the accompanying drawings, in which:

Figure 1 is a vertical sectional view of a valve embodying the present improvements, the ball being shown in elevation;

Figure 2 is a vertical cross sectional view taken on the line 2—2 of Figure 1;

Figure 3 is a detail view, partly in section, of the pendulous ball unit assembly.

Figure 4 is a perspective view of the spring clip washers for holding the ball axially on the link.

Similar reference characters designate corresponding parts throughout the several figures of the drawings.

As will be observed from the drawings, the valve includes a casing A provided at opposite ends thereof with external threads for receiving conventional coupling link and union assemblies designated generally as B. The casing A is longitudinally formed with a passageway C of different diameters for reasons which will hereinafter appear, and is also provided with a valve seat D, the said passageway communicating with the unions of the coupling arrangement B.

One side of the casing A is laterally offset as indicated at E to provide a ball valve receiving chamber F, said chamber being so proportioned and arranged longitudinally and transversely as to fully accommodate the ball 1 when it is moved to full open position, thereby to provide unobstructed free flow through the passageway C, and to also permit the insertion of cleaning devices readily through the entire valve when necessary.

Referring further to the ball 1, it will be observed that the same is provided with an axial opening having the relatively restricted, intermediate bore 2 and the recesses 3 at opposite ends thereof. Thus, as will be seen from the drawings, the restricted bore 2 of the ball 1 is adapted to receive the suspending link or arm 4, as clearly shown in Figure 3. The ball is resiliently mounted on the link through the medium of the coil springs 5 which are held in the recesses 3 by means of fork-type spring clip washers 6. These washers are engaged in suitable grooves in the link 4 and are of less diameter than the recesses 3, but of sufficient width to form abutments for the outer ends of the springs 5. Thus, it will be apparent that the ball 1 is spring mounted or cushioned in both directions on the link 4. In other words, the ball 1 is yieldingly mounted for limited movement longitudinally of the link 4, thereby making it possible for the ball to resiliently remain in a given location on the link 4 so as always to be in a position to engage the seat D upon closing. A ball mounted in this fashion cannot stick on the link and avoid full closing when flow in the line ceases or is reversed from its normal direction. In other words, the ball will normally register with the valve seat and avoid the seat wearing oblong or out of round. It will also be understood that the ball 1 is free to rotate on the link 4 so as to continually bring different portions thereof to the seat D.

As will also be seen from Figure 3 of the drawings, the link 4 which carries the ball is mounted tangentially relative to the hub 7 formed at the upper end of the link. In other words, the longitudinal axis of the link 4 is tangential to the internal diameter of the bore of the eye so that when the ball 1 is moved to full open position as shown by the dotted lines in Figure 1, the ball will more readily nest in the chamber F in order to fully clear the passageway C. That is to say, the link must be tangent to the hub so as to cause no interference with the seat D, and furthermore it allows the ball 1 to always be in contact with the seat D, even though there is no back pressure. Moreover, with this arrangement it is unnecessary to make the offset portion E of the casing extend as far laterally outward as it would be if the link were not tangentially mounted, as shown and described.

The hub 7 of the link has partially coiled thereabout the forked upper end 8 of a cushion shock absorbing spring 9 whose intermediate and lower cross sectional profile conform to and clear the outer face of the ball 1 while its lower end 10 is directed inwardly and provided with an opening to fit over the lower end of the link 4. The end 10 of the cushion or shock absorber spring 9 is held to the link by means of a spring clip washer 11 fitting in a groove on the link thereby to maintain the lower end of the spring 9 interlocked with the link.

The hub 7 of the link is adapted to receive an axle 12 which passes through the same and has one end fitted in the socket portion 13, as shown in Figure 2. The opposite end of the axle 12 is mounted in a socket of the screw plug 13 which is fitted into the side wall of the casing and provided with an exterior operating head 14. Thus the plug 13 not only secures the axle 12 in the housing E, but also serves to seal the plug opening so as to make a fluid-tight joint, which is the only opening necessary in the entire valve housing, except, of course, the openings which form part of the passageway C.

With reference to the manner of assembling the ball in the housing, it will be observed that the passageway C at the end opposite the seat D is of sufficiently large diameter to admit the ball, the link and the cushion spring 9. Once the ball unit assembly is inserted in the housing A, the latter is manipulated so that the ball falls in the chamber or pocket F thereby to bring the eye 7 into position to receive the axle 12 which is then put in position to pivotally mount the ball unit assembly prior to the installation of the plug 13 to complete the final installation of the check ball.

The operation of the device is as follows:

Assuming that the casing or housing A is inserted in the fluid line by means of the coupling arrangement B, it will be understood that the offset portion E of the housing is uppermost when the valve is installed in a horizontal line; or, on the other hand, if the valve is installed in a vertical line, the valve seat end D of the valve will be in a downward or lowermost position. In either case, as flow takes place in the direction of the arrow, Figure 1, the ball 1 will be unseated from the seat D according to the volume and pressure of the fluid in the line. Upon flow in the reverse direction, that is opposite to the arrow in Figure 1, the ball 1 will engage the seat D and thus close the line. If fluid pressure surges in the line in the direction of the arrow, it may be that the ball 1 is swung fully to the dotted line position shown in Figure 1. In that event, the cushion spring 9 will engage the inside wall of the chamber F and cushion the impact of the blow and thus prevent damage to the valve and also reduce clatter to a minimum.

As the ball 1 moves toward and from the seat, it may freely turn axially on the link to bring different surfaces thereof into contact with the seat D, and, as previously described, when the ball 1 moves to the seat D, it will also be cushioned into proper seating position by the springs 5. When it becomes necessary to insert a cleaning device in the line, it will be apparent that the device may be inserted in the direction of the arrow in Figure 1 and the ball will be moved fully into the chamber F so as to offer an unimpeded path to the cleaning device.

From the foregoing it is believed that the features and advantages of the invention will be readily understood by those skilled in the art, and it will of course be understood that changes may be resorted to within the scope of the appended claims.

I claim:

1. A valve, comprising, a casing having a passageway provided with a valve seat, said casing also having a transversely offset portion constituting a ball accommodating chamber to move transversely relative to said valve seat, a check ball unit pivotally supported in the chamber, said unit comprising a supporting hub having a tangentially disposed link formed therewith, a ball mounted on said link for rotation thereabout, cooperating means on the link and the ball for resiliently mounting said ball longitudinally of the link, and a cushion shock absorbing spring having its intermediate portion disposed in spaced relation to the ball and having opposite ends thereof respectively connected with the hub and with the link.

2. A valve, comprising, a casing having a passageway provided with a valve seat, said casing also having a transversely offset portion constituting a ball accommodating chamber, a check ball unit within the housing, said unit comprising a link tangentially connected to a hub, an axle mounted in the chamber portion of the valve casing and supporting the hub portion of the link, a ball mounted on the link for transverse movement relative to the valve seat, said ball having a central bore for slidably engaging the link and also provided with recesses at opposite ends of the bore, coil springs surrounding the link and mounted in said recesses, means on opposite sides of the ball and interengaged with said link for engaging said springs thereby to yieldingly mount the ball on the link for longitudinal movement thereon, and spring means for cushioning the impact of the ball at the end of its opening stroke with respect to the inside face of said chamber.

3. A valve, comprising, a casing having a passageway provided with a valve seat, said casing also having a transversely offset portion constituting a ball accommodating chamber, a check ball unit within the housing, said unit comprising a pendulum-type link pivotally supported in the chamber portion of the casing, a ball rotatably and yieldingly supported on the link for self-adjusting movement relative to the valve seat and also adapted for transverse swinging movement relative thereto, and a flat shock absorbing spring having opposite ends thereof connected to the opposite end portions of the link and having its intermediate portion offset from the ball, said flat spring being arranged at the side of the ball adapted to approach the outside face of the chamber when the ball is moved to full open position within the chamber.

4. A valve device comprising a casing provided with a passageway for fluid and with a valve seat surrounding said passageway, a ball valve for cooperation with said seat, an arm pivotally mounted in said casing in transversely offset relationship to said passageway and by which said ball valve is carried for transverse swinging movement between closed and open positions relative to said seat, said ball valve being mounted on said arm for rotation about the same and for longitudinal movement relative thereto, and spring means cooperating with said ball valve and said arm to yieldably resist longitudinal movement of said ball valve in either direction along said arm and to hold said ball valve normally in a position longitudinally of said arm such that said ball valve registers with said valve seat when said ball valve is swung to its closed position against said seat.

5. A valve device comprising a casing provided with a passageway for fluid and with a valve seat surrounding said passageway, a ball valve for cooperation with said seat, an arm pivotally mounted in said casing in transversely offset relationship to said passageway and by which said ball valve is carried for transverse swinging movement between closed and open positions relative to said seat, said ball valve being mounted on said arm for rotation about the same and for longitudinal movement relative thereto, abutments on said arm at opposite sides of said ball valve, and springs interposed between opposite sides of said ball valve and said abutments, respectively, to yieldably resist longitudinal movement of said ball valve in either direction along said arm and to hold said ball valve normally in a position longitudinally of said arm such that said ball valve registers with said valve seat when said ball valve is swung to its closed position against said seat.

6. A valve device as set forth in claim 5 including a spring arm connected at its ends to end portions of the arm and extending over and in spaced relationship to the ball valve remote from the seating side of the latter for contact with the casing wall to absorb shock incident to full opening of the ball valve.

FRED R. LONG.

REFERENCES CITED

The following references are of record in the file of this patent:

UNITED STATES PATENTS

| Number | Name | Date |
| --- | --- | --- |
| 719,842 | McCormick | Feb. 3, 1903 |
| 745,742 | Taube | Dec. 1, 1903 |
| 999,584 | Orton | Aug. 1, 1911 |
| 1,684,905 | Bastian | Sept. 18, 1928 |
| 1,721,353 | Oxford | July 16, 1929 |
| 1,856,138 | Ruemelin | May 3, 1932 |
| 2,059,531 | Long | Nov. 3, 1936 |